July 7, 1936.　　　F. M. SABINE　　　2,046,344
SUGAR REFINING PROCESS
Filed Feb. 24, 1933
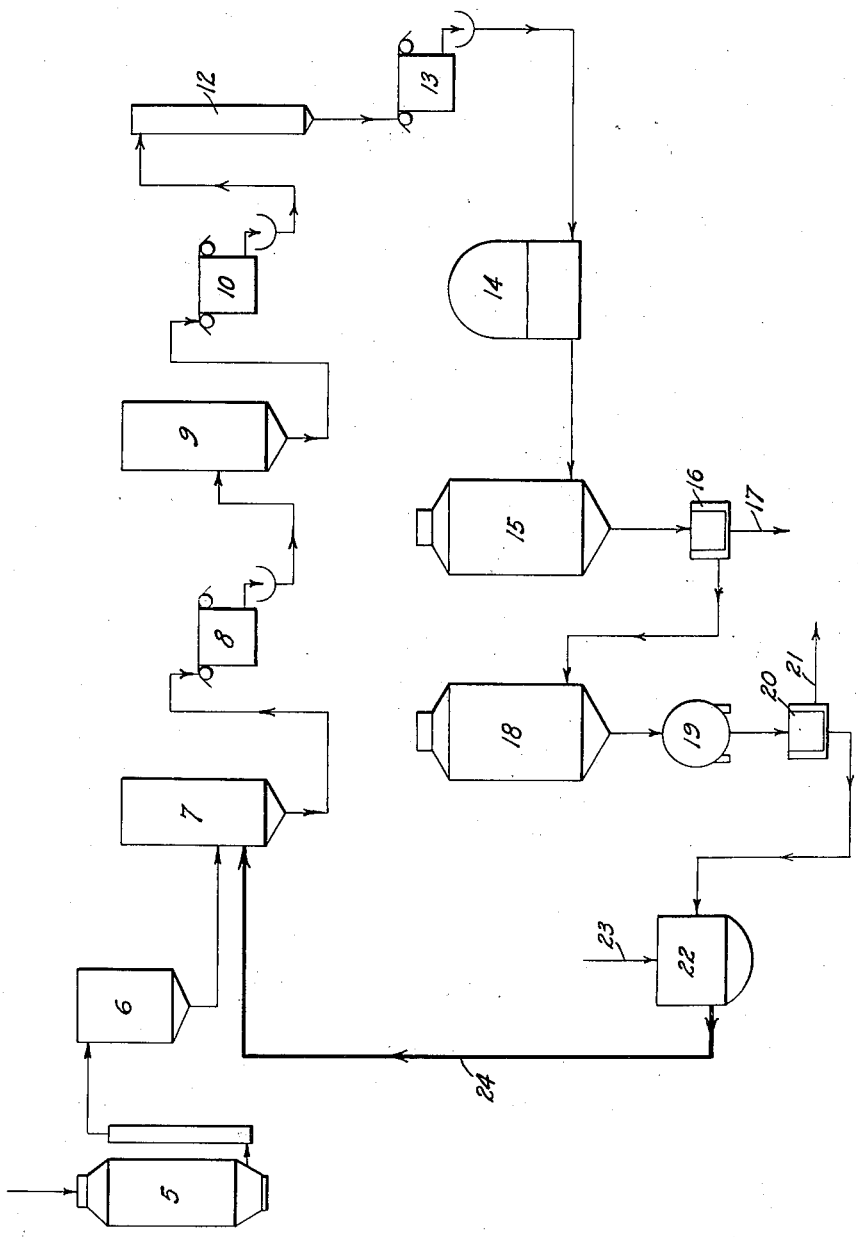
INVENTOR.
Frank M. Sabine
BY
Rollandet & Stratton
ATTORNEYS.

Patented July 7, 1936

2,046,344

UNITED STATES PATENT OFFICE 2,046,344

SUGAR REFINING PROCESS

Frank M. Sabine, Grand Island, Nebr.

Application February 24, 1933, Serial No. 658,320

3 Claims. (Cl. 127—52)

This invention relates to certain new and useful improvements in a process of manufacturing sugar in which lime is employed in a step of chemical purification of the raw unrefined juices, commonly known as the first carbonation stage.

In the process as heretofore performed, the "raw" or "high green" sugar, i. e., the sugar of lower than market quality remaining after the white refined sugar is separated from the mother liquid, has been subjected to the dissolving action of the thick juices after carbonation, for the purpose of further treatment in order to extract more of the sugar content of raw juices under treatment. This method, however, has the disadvantage of incomplete elimination of coloring matter and organic and non-organic impurities present in the raw sugar, with a resulting loss of white sugar, and the principal object of the present invention is to obtain a high percentage of extraction of white sugar by a more complete elimination of coloring matter and organic and non-organic impurities in the raw sugar, by the expedient of subjecting the raw sugar, after being brought into solution, to chemical purification resulting from the action of lime, saccharate or milk of lime, in the first carbonation stage of the process. By this action, the inorganic non-sugars, particularly sulphates present in the raw sugar, are exposed to the reaction:

$$Ca^{++} + SO_4^= = CaSO_4$$

in order to reduce the inorganic ash content of the final refined sugar, while the organic non-sugars present in concentrated form in the raw sugar, probably as oxalic acid, malonic acid, citric acid, metapectic acid, asparagine, betaine and certain coloring matters, which had not previously combined with lime, are removed either entirely or to a large percentage, by precipitation.

By re-routing the raw sugar back to the first carbonation stage of the process, the above stated object is obtained in a simple and highly efficient manner, it being apparent that by this procedure, the raw unrefined juices and the raw sugar are subjected simultaneously to the lime treatment and the subsequent steps of purification and crystallization of the refining process.

By the use of the present invention, a lower percentage of sugar ash and a better quality of product is obtained by sulphate reduction in the raw sugar and refined white sugar, lime salts are reduced due to the solubility effect of the dissolved raw sugar to carbonation, organic non-sugars, are eliminated, as stated heretofore, resulting in a purity rise of the liquor and a higher extraction, the capacity of apparatus employed in the process, is greatly increased, and at the close of the campaign, crystallizer stock can be made into marketable sugar with saccharate, or milk of lime.

In the accompanying drawing has been shown a flow sheet of the sugar process, inclusive of the improved method of treating the raw or high-green sugar.

Commencing at the source of raw sugar juices, represented by a diffusion battery 5 in which the beets or cane are cooked, the juices pass through a measuring tank 6 to the first carbonation unit 7. The product of the first carbonation after having been filtered at 8 is subjected to second carbonation in the unit 9, and the thin juices, after the second carbonation, are filtered at 10, sulphited at 12 and re-filtered at 13.

The thin juices are then evaporated at 14, and the resultant thick juices are concentrated to crystallization in what is commonly known as the "white" vacuum pan 15. The mixture consisting of a large percentage of crystals and mother liquid, commonly known as the white massecuite, is then conducted to the centrifugals 16, where the white sugar is extracted, as at 17, as a finished product from the high green syrup.

The latter is further concentrated by consecutive treatments in a vacuum pan 18, a crystallizer 19 and centrifugals 20, to produce what is commonly known as the brown or raw sugar.

The present invention relates to the further treatment of this raw sugar, in order to extract therefrom its maximum percentage of sucrose as white sugar.

The waste molasses of the centrifugals 20 is discharged as at 21, and the raw sugar is conducted to a melter 22, where it is remelted and dissolved by the addition, at 23, of a suitable solvent, as for example, raw juice, sweet water, second carbonation juice, thin juice or water, etc. The use of raw juice has been found convenient in the development of the process.

The density Brix of the resulting solution of the raw sugar, while not of primary importance, should be regulated to allow a steady return of raw sugar to the carbonation units, thereby avoiding too great a burden on the filters. A density of about 20 Brix at 20° C. of the raw juice and melted sugar solution has been found to produce satisfactory results.

While the use of raw juice as a solvent is satisfactory, especially where capacity of equipment is limited, the solvent used is largely dependent on location, and surrounding conditions, and any suitable solvent may be employed within the scope of the invention. The re-melted raw sugar in solution is now conducted along the line 24 to the first carbonation unit 7, and it will be understood that this is the one essential step in the new process of treating the raw sugar obtained in the operation of the "Brown" centrifugals 20.

While it has been common practice to return raw sugar to second carbonation, usually no lime at all or a very small amount was added, so that in order to perform the purification claimed in returning the sugar to first carbonation, a sufficient excess of lime would have to be added in second carbonation to accomplish the purification. This, however, is not necessary or practical, and the advantages and purification obtained are in no way equal to those resulting from re-routing the raw sugar to the first carbonation unit.

The re-routing process as hereinbefore described, in which remelted raw sugar is returned to the first carbonation unit accomplishes, to a remarkable degree, the production of a high quality sugar free from sulphates in the ash and of an excellent color, it being apparent that liming the raw sugar in first carbonation accomplishes this result by reducing the sulphate content to the extent that it does not crystallize out in the ash and also removes organic non-sugars present in the raw sugar in concentrated form.

After the raw sugar brought in solution in the melter has been subjected to the action of the first carbonation step of the process, it follows the same route through the refining process as the raw juices, the calcium sulfate and organic non-sugars being filtered out with the calcium carbonate formed in the carbonation process, and the white sugar being finally extracted from the "white" massecuite delivered from the "white" vacuum pan 15, in the "white" centrifugals 16.

In addition to the elimination of sulphate salts in the raw sugar and the removal of organic non-sugars, the re-routing process as herein described, also lowers the lime salts present in the second carbonation juices. These lime salts, usually organic in character, are viscous and affect the boiling of the liquors, as well as increasing the tendency to deposit scale on the evaporator tubes. When low purity beets are worked, the re-routing process has the advantage of raising the capacity of the sugar end of the process as to extraction and boiling of green syrup.

It is to be noted that by the term "raw juices," as used in the above description and in the hereunto appended claims, are included not only those derived in the refining process of beets and sugar cane, but also those obtained in the Steffens process where the sugar is recovered from molasses in the form of saccharate.

What I claim and desire to secure by Letters Patent is:

1. The process of producing sugar of low ash content comprising subjecting raw sugar juices to first and second carbonation treatments, boiling said juices, extracting white sugar therefrom, boiling the resulting high green syrup and producing therefrom a raw sugar having a high concentration of sulfate salts, returning said raw sugar to the first carbonation step having lime present, said lime acting on the sulfate salts to form insoluble salts, removing the insoluble salts from the carbonation juices, and concentrating the so-treated juices to produce a white sugar of low ash content.

2. The process of producing sugar of low ash content comprising subjecting raw sugar juices to first and second carbonation treatments, boiling said juices, extracting white sugar therefrom, boiling the resulting high green syrup and producing therefrom a raw sugar having a high concentration of sulfate salts, dissolving said sugar in a solvent medium, returning the dissolved sugar to the first carbonation step having lime present, said lime acting on the sulfate salts to form insoluble salts, removing the insoluble salts from the carbonation juices, and concentrating the so-treated juices to produce a white sugar of low ash content.

3. The process of producing sugar of low ash content comprising subjecting raw sugar juices to first and second carbonation treatments, boiling said juices, extracting white sugar therefrom, boiling the resulting high green syrup and producing therefrom a raw sugar having a high concentration of ash producing constituents, returning said raw sugar to the first carbonation step having lime present, said lime acting on the ash producing constituents to form insoluble compounds, removing the insoluble compounds from the carbonation juices, and concentrating the so-treated juices to produce a white sugar of low ash content.

FRANK M. SABINE.